Nov. 7, 1939.                C. R. HANNA                2,179,292
                    LIQUID PRESSURE CONTROL APPARATUS
                    Filed Aug. 25, 1938        2 Sheets-Sheet 1
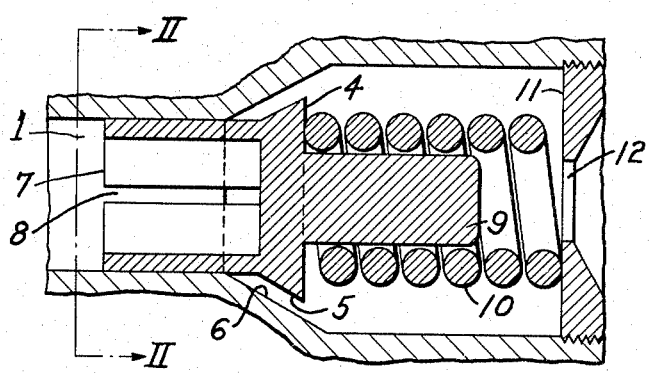
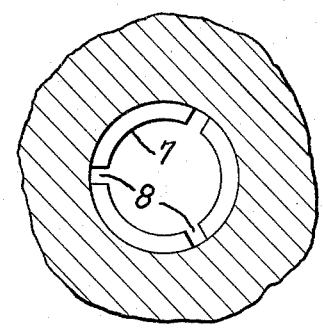
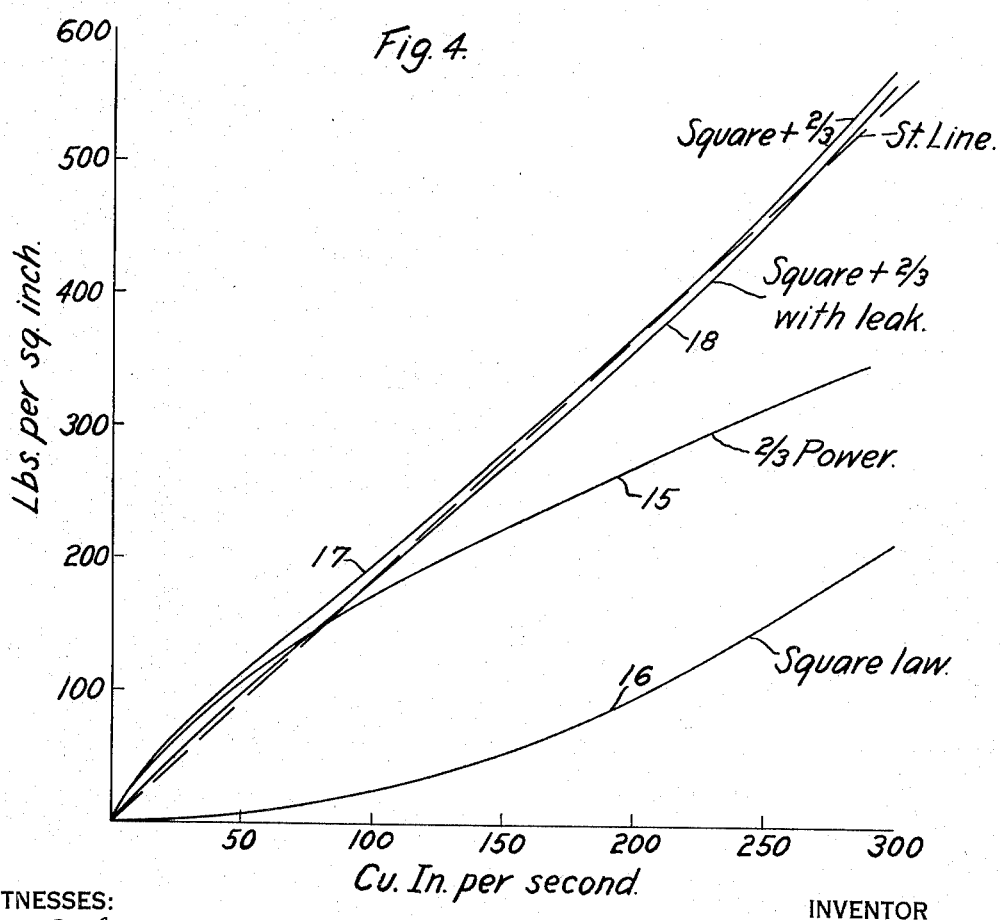
WITNESSES:                                        INVENTOR
                                              Clinton R. Hanna.
                                              BY
                                              Paul E. Friedmann
                                                    ATTORNEY

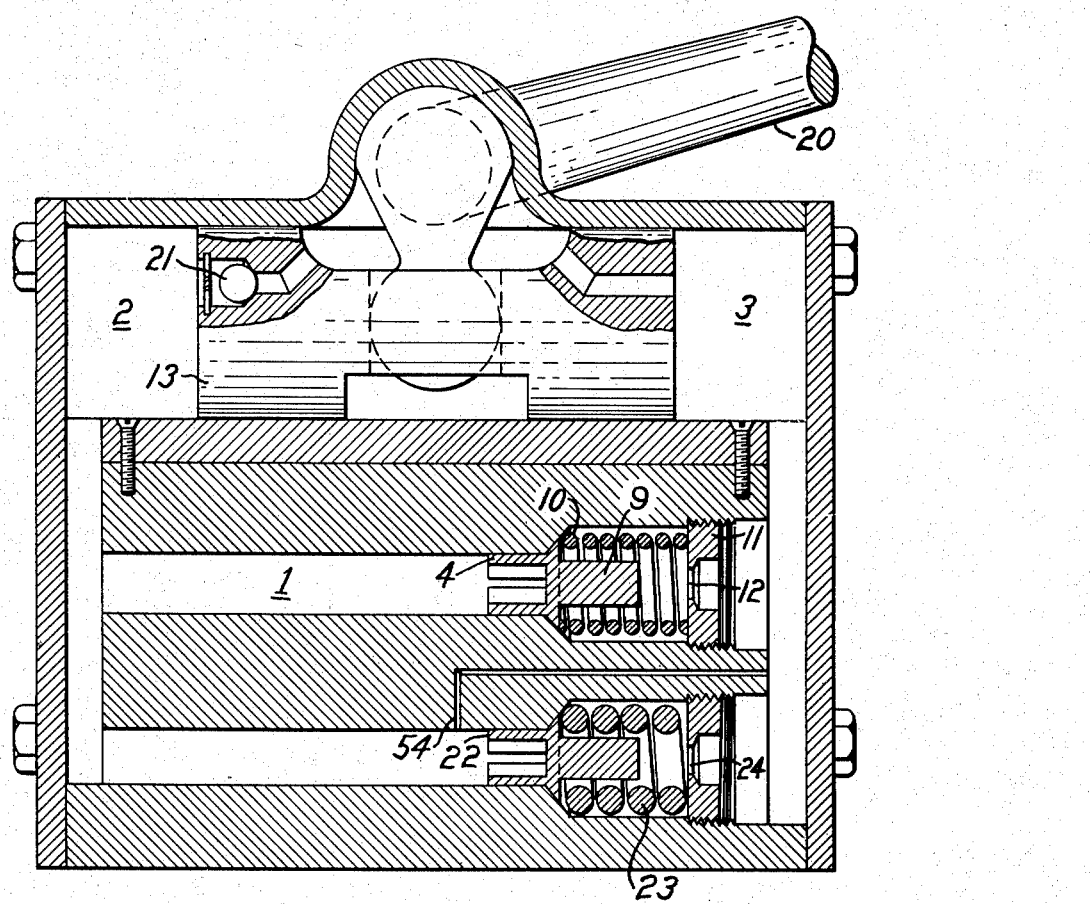

Patented Nov. 7, 1939

2,179,292

UNITED STATES PATENT OFFICE 2,179,292

LIQUID PRESSURE CONTROL APPARATUS

Clinton R. Hanna, Wilkinsburg, Pa., assignor to Westinghouse Electric & Manufacturing Company, East Pittsburgh, Pa., a corporation of Pennsylvania Application August 25, 1938, Serial No. 226,764

9 Claims. (Cl. 188—88)

My invention relates to valves, more particularly to valves for controlling the flow of liquid from a high-pressure chamber to a chamber of lower pressure.

The details of my valves have been disclosed and for a particular equipment have been claimed in my Patent No. 2,140,359, issued on an application filed December 14, 1934, entitled Valve arrangement of inertia shock absorbers and of which patent this application is a continuation in part.

In controlling the flow of liquid from a relatively high-pressure compression chamber to a chamber of lesser pressure, it is frequently desirable to control the liquid flow by valves of minimum size and which valve or valves may readily be controlled.

One broad object of my invention is to control the flow of liquid from a compression chamber as a given function of the liquid displacement in the compression chamber.

Another object of my invention is to provide for resisting the flow of liquid in conduit means, interconnecting a liquid compression chamber with a chamber of lower liquid compression, by a force substantially proportional to the rate of change of the volume of the compression chamber.

Another object of my invention is to control the pressure of a liquid in a chamber, which liquid is subject to variable pressure, in proportion to the volume velocity of the liquid flow through a conduit connected to drain liquid from the chamber.

Still other objects and advantages of my invention will be readily recognized and a fuller understanding of my invention will be had from a study of the following specification and the accompanying drawings, in which:

Figure 1 is a longitudinal sectional view of my invention;

Fig. 2 is a view of my invention on section line II—II of Fig. 1;

Fig. 3 is a sectional view of an inertia controlled hydraulic shock absorber provided with my novel pressure control valve and orifice arrangement; and Fig. 4 shows graphically the operating characteristics of my invention.

Referring to Fig. 1, it will be noted that I show a conduit 1 leading from a chamber or reservoir 2, see Fig. 3, of relatively high liquid-pressure to a chamber 3 of relatively low liquid pressure. Disposed in the conduit is a valve 4 having a conical valve seat engaging portion 5 which coacts with the valve seat 6 to completely close the conduit when there is no pressure difference between the liquid in the two chambers 2 and 3. This valve has a sleeve portion 7 provided with one or more parallel sided slits 8. If several slits are used, they are preferably symmetrically disposed around the sleeve portion 7, as shown in Fig. 2.

The valve 4 is provided with a spring holding or guiding stud 9 and a spring 10 is disposed between the rear end of the conical portion 5 and a spring positioning nut 11. The spring is disposed between these two mentioned elements so as to be under substantially no compression when the valve 4 is closed. At zero pressure on the valve 4, there will, of course, be zero opening of the valve, but the area of the opening through the slits 8 will be directly proportional to the valve deflection. In Fig. 1 the valve 4 is shown open as if liquid were being forced through the conduit 1 and the spring 10 is under compression. As shown in Fig. 3, spring 10 is under no compression.

The nut 11 disposed at the right hand end of the spring 10 is provided with a thin-walled orifice 12. The area of this orifice may have any selected value by simply selecting from a plurality of nuts having thin-walled orifices of different diameters the particular size that is desired. By a proper combination, or selection of the valve 4, of the desired slits 8, of the spring 10 and of the orifice 12, the resisting force to a movement of the liquid through the conduit 1 may be made directly proportional to the volume velocity of the liquid displaced from chamber 2, that is, the liquid pressure in chamber 2 may be made directly proportional to the quantity of liquid flowing in conduit 1 in a given time. This means, referring to Fig. 3, that the pressure in the compression chamber 2 may be made directly proportional to the velocity of movement of the piston 13 or, in other words, the shock-absorbing action.

That the foregoing theory of operation is true may be readily understood from the following analysis:

It may be readily shown that the pressure in chamber 2 is directly proportional to the area of the opening at the slits 8 and that the pressure is also proportional to the two thirds power of the volumetric velocity, or displacement of the liquid.

(1) Let $A$=area of the orifice 12;
(2) $V$=volumetric velocity of the liquid in cubic centimeters per second;
(3) $v = \dfrac{V}{A}$ = linear velocity of the liquid, as oil, and
(4) Energy=$\frac{1}{2} m v^2$ where $m$=the mass of the liquid.

The mass of the liquid used, namely oil,=$\delta A X$ where $\delta$=the specific gravity of the oil and $X$= the distance in a straight line the end of a stream of oil would move if it maintained its sectional area A and did not change its direction of movement.

(5) $\quad$ energy $= \frac{1}{2}\delta A X v^2$

Another expression for energy is $XPA$ where P is the liquid pressure, or force, acting on the area of the orifice 12. Equating, (6) $\quad PAX = \frac{1}{2}\delta AX v^2$ (7) $\quad P = \frac{1}{2}\delta v^2$ By a proper selection of the size of the slits 8 and of the spring 10, A can, for the operating range, be made proportional to P, that is (8) $\quad A = kP$ But (9) $\quad v = \frac{V}{A}$ Then

(10) $\quad v = \frac{V}{kP}$

Substituting (10) in (7)

$$P = \frac{1}{2}\delta \frac{V^2}{k^2 P^2}$$

$$P^3 = \frac{1}{2}\frac{\delta}{k^2}V^2$$

$P = KV^{2/3}$, that is, P is proportional to $V^{2/3}$, where K is the proportionality constant.

The pressure drop through the thin walled aperture or orifice 12 is proportional to the square of the velocity in accordance with the following law:

$P = \frac{1}{2}\delta v^2$, see Equation 7; therefore P is proportional to $v^2$.

By combining the pressure drop through the valve 4 and through the thin walled orifice 12 and that through the fixed orifice 54, the substantially straight line proportionality between reaction pressure or resisting force and the volume velocity of the displaced liquid may be established, as shown in the graph in Fig. 4.

Since the pressure drop through the valve 4 will vary as the 2/3 power of the volume velocity, and the pressure drop through the thin walled orifice 12 will vary as the square of the velocity, the two pressures will add to establish a total pressure drop that will be substantially directly proportional to the displacement of the liquid from the compression chamber, for the larger values of pressure within the operating range. The small orifice 54 provides a bypass for the control valves 4 and orifice 12 which serves to reduce the pressure drops past the valve and the orifice in such manner as to equalize the straight line relationship between pressure and velocity at the lower values of pressure. The curves of Fig. 4 show this.

As shown in Fig. 4, the curve 15 represents the relation between the pressure and the volumetric displacement of volume velocity of the fluid displaced from the compression chamber, which is the relationship $P = V^{2/3}$. The curve 16 represents the pressure drop through the fixed orifice 12 which is represented by $P = KV^2$. The curve 17 represents the combined drop of curves 15 and 16 whereas curve 18 represents the combined pressure drop when using the bypass orifice 54. It will be observed that by properly combining the pressures represented by the curves 15, 16 and the effect of by-pass 54, a combined pressure represented by the substantially straight line 18 for the desired operating range will be established as a reaction pressure or resisting force set up by the shock absorber.

In operation when the pressure differential rises between the two chambers 2 and 3, liquid will begin to flow. At the initial stages of any considerable liquid flow past valve 4 the spring 10 alone resists liquid flow but as soon as the flow takes on any proportions at all, a pressure is built up in the region occupied by the spring 10, which pressure also acts on valve 4. The size of the orifice 12 is thus of importance in controlling fluid flow. The nut is, therefore, designed to be removable so that nuts having various size openings may be inserted. Different weight springs may also be inserted to give different proportional controls. This is readily apparent from the showing in Fig. 3 where two different fluid flow passages are shown. The spring may be given a very slight initial compression to thus in nowise influence fluid flow for low pressures but for such low pressures leave the control entirely to orifice 54.

Fig. 3 shows my invention applied to a shock absorber such as shown in Fig. 5 of the copending application hereinbefore mentioned, except that the inertia control is not shown and the apparatus absorbs shocks only on the rebound.

The casing may be considered connected to the sprung mass of a vehicle whereas the lever arm may be considered connected to the unsprung mass, as the axle, of the vehicle.

When the wheels of the vehicle strike a bump in the road, lever arm 20 will first be moved quite freely in a counter-clockwise direction. Liquid will freely pass into the compression chamber 2. As soon as the vehicle body is accelerated vertically upward, the piston moves toward the left, that is, the arm 20 begins to move clockwise. Valve 21 closes and the liquid in the compression chamber is forced through the conduit 1, and the movement of the piston is resisted by a force substantially directly proportional to the volumetric velocity of the liquid flowing through conduit.

If the rate of movement of piston 13 is too high so that one valve and orifice arrangement does not suffice, then both valves shown, open but the valve and orifice selection for the second valve 22, spring 23 and orifice 24 may nevertheless be such as to effect a control proportional to the velocity of movement of piston toward the left.

I am, of course aware that others, particularly after having had an opportunity to become versed with the teachings of my invention, can devise similar apparatus for accomplishing the same and similar results. I, therefore, do not wish to be limited by the specific showings herein made and particularly do not wish to be limited to the particular apparatus with which my invention is shown but I wish to be limited only by the appended claims and such prior art as may be pertinent.

I claim as my invention:

1. A valve system for a hydraulic motion-damping device, comprising a valve that is spring loaded with zero initial pressure and that is designed to provide an area of opening proportional to the pressure of the fluid tending to open the valve, and a thin-walled orifice in series with the valve to establish a cooperative combined effect upon the hydraulic fluid that will render the pressure responsive to the fluid displacement.

2. In a valve system for hydraulically damping the movement of an oscillatable member, the combination with a pressure chamber containing a fluid, in which said oscillatable member is movable as a pressure-developing member, of a conduit leading from the chamber to provide a passage to conduct the liquid therefrom under the developed pressure, and valve means in said conduit consisting of a spring loaded valve with substantially zero initial pressure loading and designed to present an opening proportional to the fluid pressure, and a narrow-walled orifice in the passage in series with the valve.

3. In a valve system for hydraulically damping the movement of an oscillatable member, the combination with a pressure chamber containing a fluid, in which said oscillatable member is movable as a pressure-developing member, of a conduit leading from the chamber to conduct the liquid therefrom under the developed pressure, and valve means in said conduit consisting of a spring loaded valve designed to present an opening whose area is proportional to the pressure of the fluid, and of a back-up narrow walled orifice in the conduit in series with the valve.

4. A valve system for hydraulically damping the movement of an oscillatable member, comprising a closed pressure chamber containing a fluid and a movable member therein mechanically connected to the member to be damped, a conduit leading from the chamber, a first control device in the conduit consisting of a spring biased sleeve valve with a slot of constant width in the sleeve portion and under substantially zero initial spring force to develop a pressure proportional to the two-thirds power of the fluid velocity, and a second control device in the conduit consisting of a thin wall having an orifice disposed to be in series with the first valve device to add a pressure to the fluid that is proportional to the square of the fluid velocity, whereby the resulting fluid pressure is caused to be nearly a straight line function of the fluid volumetric velocity.

5. In a hydraulic damping system for a movable member, a compression chamber containing a fluid, a piston in the chamber and adapted to be connected to the movable member, a conduit leading from the chamber to conduct the fluid from the chamber, and means in the conduit for establishing a reaction pressure against the fluid proportional to the displaced fluid velocity, said means including a valve means for establishing a pressure proportional to the two-thirds power of the fluid velocity, and a thin-wall orifice in series with the valve to establish a pressure proportional to the square of the fluid velocity, whereby the combined pressures will combine to establish a substantially straight line function of the fluid velocity.

6. A hydraulic shock absorber comprising a container embodying a compression chamber, a movable piston therein, and adapted to be mechanically connected to an external member whose motion is to be damped, a conduit connected to the chamber to conduct the displaced fluid from the chamber, and means in the conduit for establishing a reaction pressure against the displaced fluid and proportional to the displaced fluid velocity, said means including, as a first control unit, a self-adjustable spring-loaded valve for establishing a pressure proportional to a less-than-unity power of the fluid velocity, and including, as a second control unit, an element having an orifice in series with the valve to establish a pressure which, when added to the pressure established by the valve, will make the total reaction pressure, against the displaced fluid, a substantially straight line function of the fluid velocity.

7. In a hydraulic braking device for a movable member, means for developing a reaction braking pressure substantially directly proportional to the velocity of the movable member, comprising a body of fluid disposed to be moved by the movable member, a conduit to conduct the fluid, a spring-loaded valve in the conduit designed to provide a passage opening for the fluid whose area will be proportional to the fluid pressure, and an element in series relation with the valve to provide a fixed orifice for the displaced fluid to pass through the dimension of the orifice being made such as to provide a pressure drop which, when added to the pressure drop through the valve, will establish the desired direct relationship of pressure to velocity.

8. In a hydraulic damping system for a pair of relatively movable members, a compression chamber containing a fluid in one of the movable members, a piston in the chamber and adapted to be connected to the other movable member, whereby relative movement of the members alters the volume of the compression chamber, a conduit leading from the chamber for conducting fluid from the chamber when the piston is moved to decrease the volume of the compression chamber, and fluid flow restricting means in said conduit adapted to restrict the flow of fluid through the conduit so as to maintain the pressure in the compression chamber in proportion to the change of volume of the compression chamber.

9. A valve system for a hydraulic motion-damping device, comprising a valve that is spring loaded with substantially zero initial pressure and that is designed to provide an area of opening proportional to the pressure of the fluid acting to open the valve, and further fluid flow restricting means coacting with said valve and adapted to establish a cooperative combined effect upon the hydraulic fluid that will render the pressure proportional to the fluid displacement.

CLINTON R. HANNA.